United States Patent [19]
Pelensky et al.

[11] Patent Number: 4,564,852
[45] Date of Patent: Jan. 14, 1986

[54] PENS FOR LOW TORQUE CHART RECORDERS

[75] Inventors: Joseph Pelensky, Philadelphia, Pa.; James R. Hubbard, Moorestown; John J. Scanlon, Mount Laurel, both of N.J.

[73] Assignee: Graphic Controls Corporation, Buffalo, N.Y.

[21] Appl. No.: 767,053

[22] Filed: Aug. 16, 1985

Related U.S. Application Data

[63] Continuation of Ser. No. 555,341, Nov. 28, 1983.

[51] Int. Cl.⁴ ............................................. G01D 15/16
[52] U.S. Cl. .................................. 346/140 R; 177/250
[58] Field of Search ........... 346/139 R, 140 R, 140 A; 177/250, 235

[56] References Cited

U.S. PATENT DOCUMENTS 2,199,078 4/1940 Lindemann ..................... 346/140 A
3,934,255 1/1976 Taylor ............................. 346/140 A
4,367,481 1/1983 Bunning ........................... 346/140 A

FOREIGN PATENT DOCUMENTS 1164110 2/1964 Fed. Rep. of Germany ...... 346/140

Primary Examiner—E. A. Goldberg
Assistant Examiner—Mark Reinhart
Attorney, Agent, or Firm—Ratner & Prestia

[57] ABSTRACT

A disposable marker apparatus for use with low torque recorders includes a bifurcated body with two separate ink reservoirs in the first and second body segments interconnected by a connector segment. The connector segment includes an ink transmitting member. A stylus tube extends from the body. A pivot member is provided to engage an associate pivot support outwardly from said pen body. A substantial portion of the mass of the marker is below the connector segment and the pivot member. The result is a marker having a center of gravity below the pivot so that the swinging marker tends to stabilize after disturbance due to vibration or rapid marker excursion.

29 Claims, 16 Drawing Figures

PENS FOR LOW TORQUE CHART RECORDERS

This application is a continuation, of application Ser. No. 555,341, filed Nov. 28, 1983.

FIELD OF THE INVENTION

This invention relates generally to low torque chart recorders and more particularly to markers or pens (the terms "marker" and "pen" are generally used interchangeably) for such recorders. The pens and markers of this invention include self-contained fibrous ink reservoirs.

DESCRIPTION OF THE PRIOR ART

Strip chart and circular chart recorders provide a graphic record of voltage, current, watts, frequency, speed, temperature, and numerous other variables.

Pens used with these recorders generally include a self-contained ink supply or are connected to a remote ink supply. Such pens are disclosed, respectively, in U.S. Pat. No. 2,199,078—Lindemann and U.S. Pat. No. 2,626,201—Young et al. Remote ink supply pen systems are relatively complex (and therefore costly) and are subject to breakdown or failure. Self-contained liquid ink supply pens offer some advantages, over remote ink supply systems, but must be periodically refilled.

The Lindemann and Young et al pen systems appear to be intended for use in certain types of recording instruments, such as galvanometers, in which the recorder driving force or torque is low. In such instruments, referred to herein as "low torque recorders," it is important that the marker and associated marker holding mechanism have a low moment of inertia about the vertical pivot axis of the recorder.

As is also typical of these low torque recorder marking systems, the Lindemann and Young et al pens are delicately balanced on a horizontally extending low friction support member to maintain proper writing tip pressure and to provide required stabilizing capabilities in response to disturbances caused by vibration and rapid marker excursion. That support member has a circular cross section in the Lindemann instrument, while that shown in the Young et al patent has a knife edge pivotal support with a wedge-shaped cross section. Generally, the support member is supported, in existing systems, on the upwardly extending arms of a yoke with a downwardly extending central pivot member.

Markers for recording instruments other than low torque recorders have been substantially improved over the past several years by the use of capillary ink reservoirs comprising ink laden fibrous material. For the most part, these markers are considered disposable after a single use. Examples of such markers are disclosed in U.S. Pat. Nos. 3,934,255—Taylor, 4,100,549—Hubbard, and 4,233,609—Hubbard. One such disposable marker is disclosed in U.S. Pat. No. 4,367,481—Bunning. The Bunning marker is apparently intended for use in an existing low torque recorder.

The general object of the present invention is to provide a practical, functional, easily manufacturable, and easily installable marker for certain existing low torque recorders, which marker is well balanced and includes optimal weight distribution so as to minimize the moment of inertia of the marker-marker mount combination.

BRIEF DESCRIPTION OF THE INVENTION

This is accomplished by providing a marker including a bifurcated ink reservoir having first and second portions interconnected by at least one and preferably two ink transmitting members. Ink retaining reservoir material is disposed in two main marker body segments comprising each of the first and second portions. The ink transmitting or conveying means associated with the bifurcated ink reservoir is housed in a connector segment of the marker.

A stylus tube with an ink delivery means and a writing tip extends from one of the main marker body segments (the front segment) in a direction away from the other segment. Preferably, a counterbalance means is located on the other or rear main marker body segment and consists of a threaded support member on which is engaged a threaded counterbalance weight with means for resiliently disengaging the threaded engagement therebetween.

A horizontally disposed support member is located on the underside of the connecting members halfway between the two marker body segments. The support member extends outward from the connecting members and the outward extentions of the support member, which may be wedge or knife edge or circular in cross-section to minimize friction, are adapted to be received, outboard of the connector segments, in an upwardly extending mounting yoke of a low torque recorder. The two marker body segments are suspended below the marker support member. As a result, the center of gravity of the marker is below the support member and the entire marker is located substantially within outer limit lines defined by, and symmetrical with a center line defined by the mounting yoke.

For a more complete description of the present invention reference may be made to the following detailed description thereof together with the accompanying drawings and the subjoined claims.

DETAILED DESCRIPTION OF THE INVENTION

Figure 1:
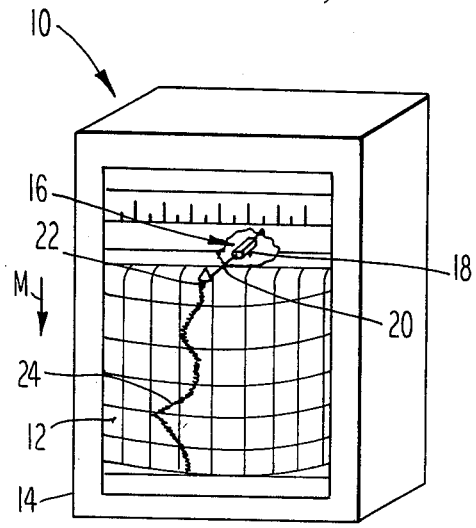
FIG. 1 is an perspective view of a typical existing low torque recorder, in which a marker of the invention is adapted to be used.

Referring now to the drawings and particularly FIG. 1, recorder 10 includes a moving chart 12 enclosed in a housing 14. A marker 16, including a stylus tube 20 includes a writing tip 22 resting on chart 12. Marker 16 is supported by and balanced on a yoke support (not shown in FIG. 1) so that writing tip 22 of tube 20 exerts an acceptable pressure on chart 12. Marker 16 is free to pivot on the vertical axis 18 of a yoke support in accordance with electronic drive means (not shown) associated with the yoke support on which marker 16 is mounted. Chart 12 is electronically driven to move relative to tip 22 in a direction indicated by an arrow designated M. As a result, a continuous ink residue pattern 24 is deposited on chart 12 so that a desired record is accumulated.

A preferred embodiment of marker 16 is illustrated in FIGS. 2, 3, and 11 through 15.

Figure 4:
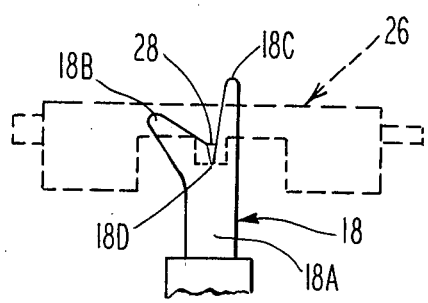
FIG. 4 is a side view illustrating an exemplary pivot support yoke in an existing low torque recorder to which is adapted the marker shown in FIGS. 1-3.
Figure 2A:
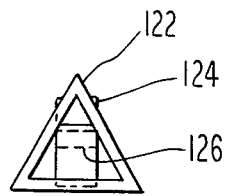
FIG. 2A is a view taken along line 2A—2A of FIG. 2.
Figure 2:
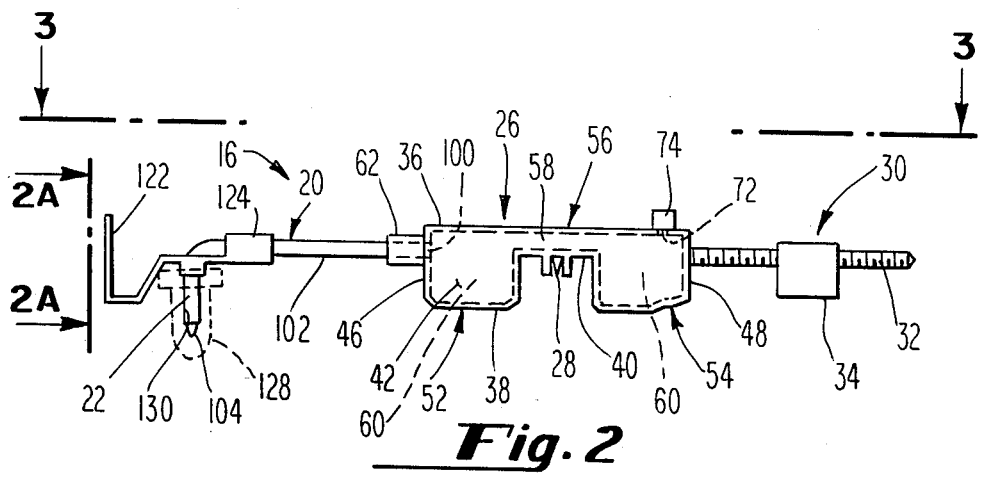
FIG. 2 is a side view illustrating one embodiment of this invention.
Figure 3:
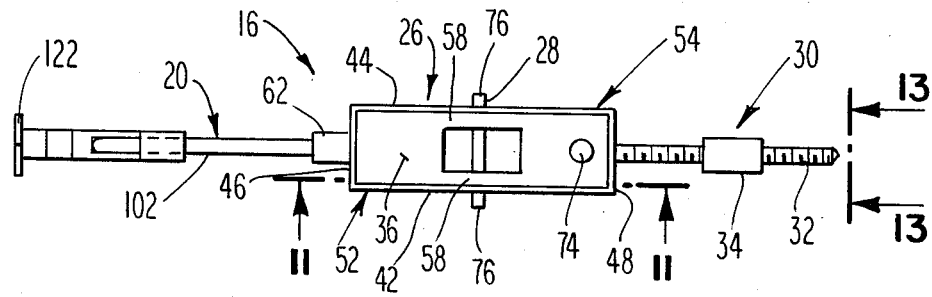
FIG. 3 is a view taken along line 3—3 of FIG. 2.

Referring more specifically to FIGS. 2 and 3, marker 16 includes a body housing or case 26 enclosing a bifurcated fibrous ink reservoir 60 consisting of two separate and equal size segments of reservoir disposed in body segments 52 and 54. A horizontally extending pivot means 28 is centrally disposed on the underside of body connecting segments 56 for engaging a yoke support 18, as seen in FIG. 4. Stylus tube 20 extends from case 26 in a first direction. A counterbalance 30, including threaded receiver 32, extends from case 26 in the opposite direction, and a movable balance member 34 is disposed on receiver 32.

Case 26 is typically formed of a suitable synthetic resin material and includes a top 36, a bottom 38, opposed sides 42,44, and opposed ends 46,48. Case 26 includes first and second body segments 52,54, respectively, and relatively smaller connector segments 58. The construction of case 26, including first segment 52 and second segment 54 defines a bifurcated ink reservoir 60 interconnected by connector segments 58.

Figure 5:
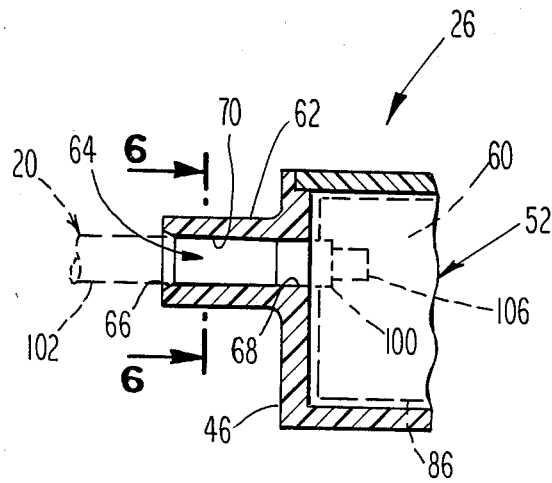
FIG. 5 is an exploded partial side view illustrating one detail of an embodiment of the marker body of this invention.
Figure 6:
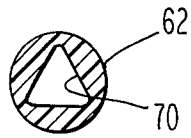
FIG. 6 is a view taken along line 6—6 of FIG. 5.
Figure 7:
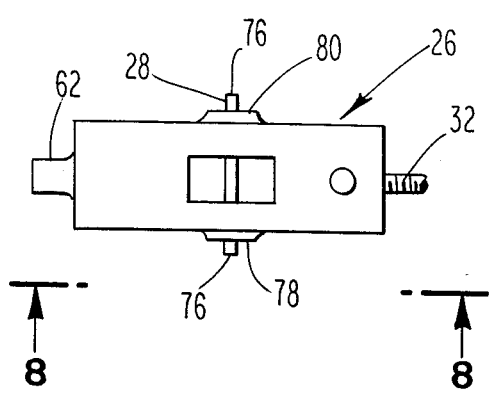
FIG. 7 is a top view illustrating an alternative embodiment of the marker body of this invention.
Figure 9:
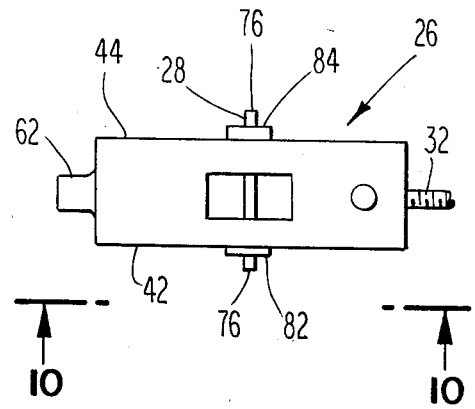
FIG. 9 is a top view illustrating another alternative embodiment of the marker body of this invention.
Figure 8:
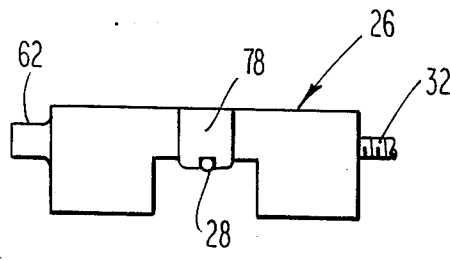
FIG. 8 is a view taken along line 8—8 of FIG. 7.
Figure 10:
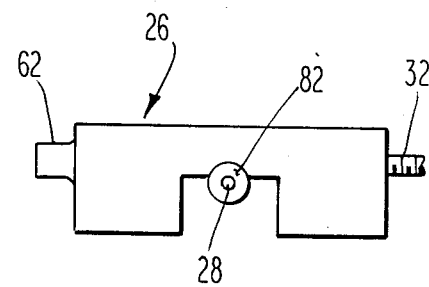
FIG. 10 is a view taken along line 10—10 of FIG. 9.

A protrusion 62, FIG. 5, extends from end 46 and includes an aperture in the form of a throughbore 64 opening into first body segment. Throughbore 64 includes an annular chamfer 66 and a cylindrical region 68 in end 46 interconnected by an intermediate noncylindrical portion 70, see also FIG. 6, having at least three sides. A vent 72, FIG. 2, is preferably formed in the top 36 of second body segment 54 and a suitable resilient vent plug 74 is provided in vent 72.

Figure 11:
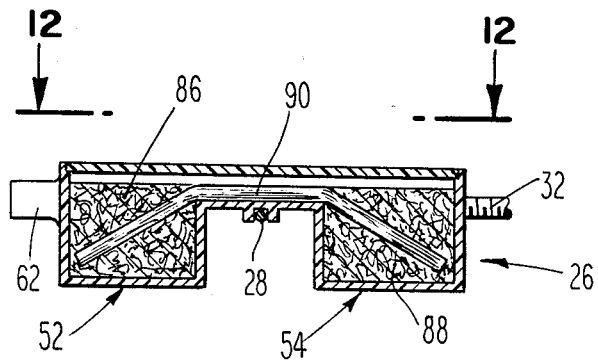
FIG. 11 is a side view, in cross section, of the marker body and ink reservoir of the marker apparatus shown in FIGS. 2 and 3, taken in the plane 11—11.
Figure 13:
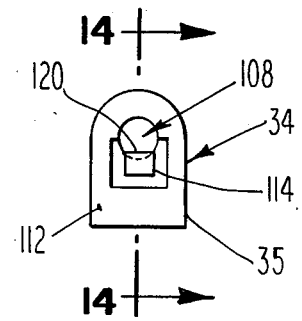
FIG. 13 is an exploded end view illustrating another feature of the marker shown in FIGS. 2 and 3, in the plane 13—13.

Pivot means 28, FIGS. 2 and 3, extends transversely of sides 42,44 on the underside of connectors 58 and includes ends 76 extending outwardly therefrom, as seen in FIG. 3. Depending on the type of pivot support 18 to be used, pivot means 28 can be of a wedge-shaped or knife edge cross section, as seen in FIG. 2, or a circular cross section, as illustrated in FIG. 11. Because first and second segments 52,54 of case 26 (as well as the reservoir portions housed therein) are disposed substantially below pivot means 28, on which marker 16 is supported, the center of gravity of marker 16 is also below pivot means 28.

The yoke support 18 shown in FIG. 4 typically includes a central downwardly extending pivot member 18A and a pair of laterally spaced upwardly extending yoke arms, each with split ends 18B and 18C forming a crotch 18D. Support member 28 rests in and extends between the crotches 18D of split ends 18B and 18C of the laterally spaced paired yoke arms.

The lateral spacing between the upwardly extending arms of mounting yokes in existing low torque recorders of different manufacturers varies somewhat.

Therefore, in order to adapt marker 26 to the pivot supports of different manufacturers (General Electric, Westinghouse, and Esterline Angus all make low torque recorders to which the present invention may be adapted) it may become necessary to extend sides 42,44 of case 26. For this purpose, extensions 78,80, see FIGS. 7, 8, 9, 10, can be formed with sides 42,44 respectively, or in the alternative, metallic or plastic washers 82,84 can be attached as extensions to sides 42,44 respectively, in a suitable manner such as with an adhesive or the like. In either case pivot means 28 will have sufficient length so that ends 76 extend through the extensions and the entire marker, in all cases, is located symmetrically within mounting yoke 18.

Figure 12:
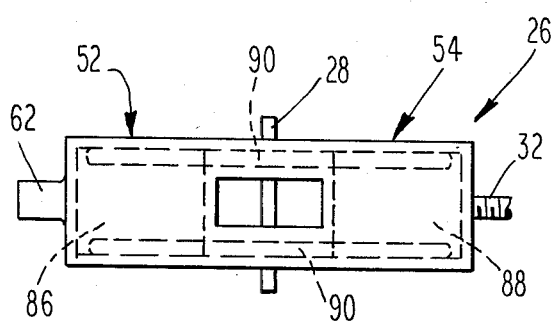
FIG. 12 is a view taken along the line 12—12 of FIG. 11.
Figure 14:
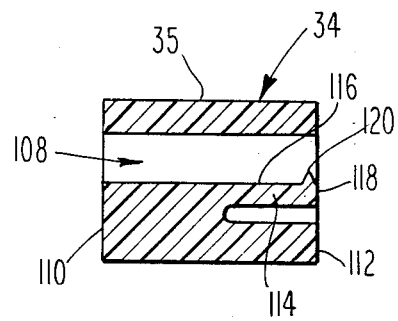
FIG. 14 is a sectional view taken along line 14—14 of FIG. 13.
Figure 15:
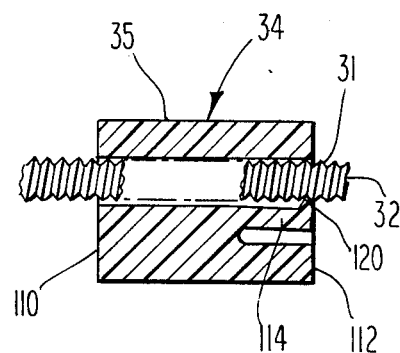
FIG. 15 is a sectional side view illustrating the assembled relationship of the elements seen in FIGS. 13 and 14.

A commercially available, ink-retaining fibrous reservoir material is used to retain ink in case 26, see FIGS. 11 and 12. Preferably, first and second equal size segments 86,88 of reservoir material are stored in first and second body segments 52,54, respectively. The height, width and length (0.29, 0.32, and 0.4 inches, respectively) as well as the overall shape (i.e., rectangular) of reservoir segments 86,88 are such that segments 86,88 can easily be produced from commercially available forms of reservoir material. In order to communicate ink between segments 86,88 ink conveying wicks 90 extend through connector segments 58 and terminate in engagement with sections 86,88.

Stylus tube 20, FIGS. 2, 3, 5, comprises an elongated cylindrical metal tube which may vary in shape and length to accommodate the recorders of various manufacturers. Tube 20 has an end 100 which extends into protrusion 62 and is press-fit into cylindrical region 68. The resulting spaces between noncylindrical portion 70 and cylindrical tube 20 act as a reservoir for a suitable adhesive to retain tube 20 attached to case 26. Tube 20 has an elongated portion 102, extending from end 100, and a perpendicular short portion 22 terminating with a nib 104 of a suitable ink transmitting material, which is inserted into the bent short portion 22 of tube 20. A wick 106 also of suitable ink transmitting capability extends from nib 104, substantially along the length of tube portion 22 and 20 and beyond end 100 so as to protrude into first reservoir segment 52 in ink transfer communication with reservoir section 86.

Threaded receiver 32, FIGS. 2 and 3, extends from end 48 of case 26. Balance member 34 has a main body 35 formed of a suitable synthetic material and can be of any desired size and shape, see FIG. 15. However, size and shape will vary according to a necessary increase or decrease in volume in order to counterbalance an appropriately sized stylus tube 20. Balance member 34 includes an aperture in the form of a smooth throughbore 108 extending from a first end 110 to a second end 112. A cantilever-type resilient member 114 is formed adjacent second end 112. That is, resilient member 114 has an end 116, attached to the main body 35 of member 34, and extends coaxially along bore 108 to terminate at a free end 118 adjacent second end 112. A tooth 120, attached to free end 118, protrudes into bore 108 so as to engage the threads 31 of threaded receiver 32. More than one tooth could be provided but only one tooth 120 is required. Resilient member 114 permits balance member 34 to be rapidly guided along threaded receiver 32 in a ratchet-like manner for coarse adjustment. Fine adjustment is accomplished by rotating balance member 34 axially along receiver 32. Movement of balance member 34 axially along receiver 32 is limited by sequential engagement of tooth 120 and the threads 31 of receiver 32.

An indicator arrow 122, FIGS. 2, 2A, 3, is mounted on stylus tube 20 adjacent perpendicular short tube portion 22. Arrow 122 is formed of a suitable synthetic resin material and has a first gripper 124 engaged with elongated portion 102 and a second gripper 126 engaged with perpendicular short tube portion 22. Because of the substantially perpendicular relationship between elongated portion 102 and short tube portion 22, indicator 122 is maintained in a desired position on tube 20 limited from rotation.

A protective cap 128, FIG. 2, formed of a suitable resilient material, is provided with a blind bore 130 suitable for an interference fit with short tube portion 22. Cap 128 can therefore be retained on tube 20 to provide protection for short tube portion 22 when marker 16 is not in use, such as during shipping.

The foregoing has described a disposable marker apparatus with a variably adjustable counterbalance for use with chart recorders. The marker has a self contained ink supply and has a counterbalance device which can be quickly and easily coarse-fine adjusted to assure acceptable writing tip pressure. Also, the marker of this invention is easily adaptable for use with a variety of commercially available low torque recorders. This is accomplished by changing the length of tube 20, changing the size and shape of balance member 34, using case 26 with side extensions 78,80 or 82,84 using case 26 without any side extensions, or using either a wedge-shaped or cylindrical pivot member 28. One such recorder, the Esterline Angus, includes a centrally disposed upwardly extending clip within the upwardly extending mounting yoke arm. The function of this clip is to better retain prior liquid ink pens on the support member. This clip is unnecessary with the markers of the present invention and may simply be bent downward so as to avoid interference with the marker body. Alternatively, the clip may be permitted to extend upwardly and through the space between connector segments 58.

It is anticipated that aspects of the present invention, other than those specifically described and illustrated will be apparent from the foregoing description and the drawings, and many other variants of the invention may be devised. The appended claims are intended to be construed to encompass all such variants and aspects which are within the true spirit and scope of the invention.

Having thus described the invention, what is claimed is:

1. A marker comprising:
 a bifurcated body having first and second ink reservoirs and a connector segment forming at least one ink passage between said reservoirs;
 ink retaining material in each of said reservoirs;
 means extending through said connector segment for conveying ink between said reservoirs and for maintaining equal levels of ink in said reservoirs;
 a stylus tube extending in a first direction from a first end of said body for transmitting ink to a tip thereof; and
 pivot means extending across said connector segment and beyond the lateral sides thereof for engaging an associated pivot support on a yoke support outward of said lateral sides, said pivot means bisecting a centrally disposed line between said reservoirs.

2. The marker of claim 1 including:
 a counterbalance extending from a second end of said body in a second direction opposite said first direction.

3. The marker of claim 2 wherein said ink conveying means comprises separate wicks extending through a pair of spaced apart connectors comprising said connector segment, each wick having opposite ends engaged with said ink retaining material in said first and second body segments.

4. The marker of claim 2 wherein said counterbalance includes a threaded receiver.

5. The marker of claim 4 including:
 a movable balance member having a resilient portion engaging said receiver.

6. The marker apparatus of claim 1 including:
 a protrusion extending from said first end of said body, said protrusion having an aperture opening into said first segment of said body; and
 a first end of said writing arm extending through said aperture into said first body segment.

7. The marker of claim 6 wherein said aperture has an annular chamfer at one end, a cylindrical region at an opposite end adjacent said first portion of said body, and at least three sides along a portion intermediate of said chamfer and said cylindrical region.

8. The marker of claim 7 wherein said writing arm is press fit into said cylindrical region.

9. The marker of claim 1 wherein said pivot means has a wedge-shaped cross section.

10. The marker of claim 1 wherein said pivot means has a circular cross section.

11. The marker of claim 1 wherein said stylus tube includes a first elongated portion extending substantially in said first direction and a second writing tip portion extending substantially perpendicular relative to said elongated portion.

12. The marker of claim 11 including:
 an indicator arrow having a first gripper engaged with said elongated portion and a second gripper engaged with said writing tip.

13. A marker as recited in claim 1 wherein said ink reservoirs are disposed substantially below said connector segment.

14. A marker as recited in claim 13 wherein said pivot means extends along the underside of said connector segment.

15. A marker as recited in claim 14 wherein said connector segment has two passages between said reservoirs and conveying means extending through both of said passages.

16. A marker as recited in claim 15 wherein a central vertical opening is disposed between said two passages and said pivot means spans said opening.

17. A marker as recited in either of claims 1 or 16 wherein each of said ink reservoirs is of a generally cubic shape.

18. A marker as recited in claim 5 wherein said resilient portion is a cantilever formed between (a) a bore running the entire length of said balance member and through which said receiver extends, and (b) a slot spaced radially outward of said bore and extending axially of said balance member from one end thereof.

19. A marker as recited in claim 18 wherein said bore has at least one tooth extending radially inward of said bore from said cantilever into engagement with said threaded receiver.

20. In combination with a low torque recording instrument of the type including a pivot support and a movable chart, a marker, comprising:
a bifurcated ink reservoir body, said body having first and second segments interconnected by an intermediate segment, said intermediate segment including a pair of spaced apart connectors, said body segment being disposed substantially below said intermediate segment;
fibrous ink retaining material in each of said first and second body segments;
means for conveying ink between said first and second body segments, said conveying means extending through each of said connectors; and engaging said ink retaining material in said first and second body segments;
a stylus tube extending in a first direction from a first end of said body;
a counterbalance extending in a second direction from a second end of said body; and
pivot means adapted to engage said pivot support outwardly from said body, said pivot means comprising a horizontally extending member disposed on the underside of said connectors.

21. The marker of claim 20 wherein said pivot means includes opposite ends extending substantially beyond opposite sides of said intermediate segment.

22. The marker of claim 20 including:
an extension formed with each opposite side of said intermediate segment; and
said pivot means includes opposite ends extending substantially beyond said extensions.

23. The marker of claim 20 including:
a pair of extensions attached to each opposite side of said intermediate segment; and
said pivot means includes opposite ends extending substantially beyond said extensions.

24. A marker comprising:
an ink reservoir;
ink retaining material in said reservoir;
a stylus tube extending in a first direction from a first end of said ink reservoir for transmitting ink to a tip thereof;
pivot means for pivotally mounting said ink reservoir on a yoke support; and
a counter balance assembly extending in a second direction, opposite said first direction, from a second end of said ink reservoir, said counterbalance assembly including an externally threaded member extending through an axial bore of a female member and engaging at least one tooth extending radially inward of said bore at one end of said female member, said female member having a slot spaced radially outward of said bore and extending a predetermined length from said one end of said female member to form a cantilever between said bore and said slot.

25. A marker as recited in claim 24 wherein said threaded member is attached to said second end of said ink reservoir and said female member is movable along the length of said threaded member.

26. A marker as recited in claim 24 wherein said one end of said female member is remote from said second end of said ink reservoir and said slot extends toward said second end of said ink reservoir parallel to said axial bore.

27. A marker comprising:
an ink reservoir;
ink retaining material in said reservoir;
a stylus tube extending in a first direction from a first end of said ink reservoir for transmitting ink to a tip thereof;
pivot means for pivotally mounting said ink reservoir on a yoke support;
an externally threaded receiver extending in a second direction, opposite said first direction, from a second end of said ink reservoir; and
a movable balance member having an axial bore through which said threaded receiver extends and a slot spaced radially outward of said bore and extending a predetermined length along said movable balance member from one end thereof to form a cantilever between said bore and said slot, said cantilever having at least one tooth extending radially inward of said bore and engaging said threaded receiver.

28. A marker as recited in claim 27 wherein said tooth is at said one end of said movable balance member.

29. A marker as recited in claim 28 wherein said one end of said movable balance member is remote from said second end of said ink reservoir and said slot extends toward said second end of said ink reservoir parallel to said axial bore.

* * * * *